United States Patent [11] 3,596,180

[72] Inventor Alfons Schmitt
Talheim, Germany
[21] Appl. No. 719,642
[22] Filed Apr. 8, 1968
[45] Patented July 27, 1971
[73] Assignee Telefunken Patentverwertungsgesellschaft m.b.H.
Ulm Danube, Germany
[32] Priority Apr. 8, 1967
[33] Germany
[31] T33677 VIIIc/21g

[54] METHOD AND APPARATUS FOR AUTOMATICALLY ARRANGING, TRANSPORTING, AND MEASURING, AND/OR TESTING A PLURALITY OF SEMICONDUCTOR DEVICES
11 Claims, 7 Drawing Figs.
[52] U.S. Cl. ........................................... 324/158 T,
324/73 R, 324/158 D
[51] Int. Cl. ......................................... G01r 31/22,
G01r 15/12
[50] Field of Search ......................... 324/158 T,
158 D, 73 AT, 20; 198/220 B, 10; 209/73, 81;
29/574

[56] References Cited
UNITED STATES PATENTS

| | | | |
|---|---|---|---|
| 2,781,885 | 2/1957 | Taylor | 198/220 X |
| 3,175,153 | 3/1965 | Paessler | 324/158 |
| 3,184,056 | 5/1965 | Kisor | 324/158 UX |
| 3,238,455 | 3/1966 | Jankowski | 324/158 |
| 3,304,499 | 2/1967 | Vincze | 324/158 |
| 3,434,055 | 3/1969 | Frick | 324/20 X |
| 3,235,803 | 2/1966 | Ionai et al. | 29/574 X |

OTHER REFERENCES
IBM Technical Disclosure Bulletin, " Test Fixture" (J. V. Meehan), Vol. 1, #5, Feb., 1959, page 15

*Primary Examiner*—Rudolph V. Rolinec
*Assistant Examiner*—Ernest F. Karlsen
*Attorney*—Spencer and Kaye ABSTRACT: A method and apparatus for arranging and measuring and/or testing characteristics of subminiature semiconductors. The semiconductors are fed onto and lined up, one behind the other, on tracks which extend parallel with respect to each other. Electrode leads extending from the semiconductors are disposed between the tracks, thus provided. At predetermined locations along the tracks electrical contact means are provided which electrically connect the semiconductor electrode leads to measuring and/or testing instruments.

Inventor:
Alfons Schmitt
By Spencer & Kaye
Attorneys

INVENTOR
Alfons Schmitt

METHOD AND APPARATUS FOR AUTOMATICALLY ARRANGING, TRANSPORTING, AND MEASURING, AND/OR TESTING A PLURALITY OF SEMICONDUCTOR DEVICES

BACKGROUND OF THE INVENTION

The present invention relates to a method and apparatus for arranging and measuring (which term as used in the specification and claims also includes testing) seimconductor devices (e.g., transistors) which provide that the semiconductor devices are lined up on parallel bands or tracks, one behind the other, in such a manner that electrode leads on the semiconductor devices are disposed between the parallel bands or tracks and that at least portions of the bands or tracks are used as electrical contact means to electrically connect measuring instruments to the electrode leads of the semiconductor devices.

A sorting and measuring method is known in which semiconductor devices, whose semiconductor elements are mounted on a housing support and are hermetically sealed in a housing cap, are individually brought into an automatic measuring instrument. Such an automatic measuring instrument comprises, for example, a circular table having a plurality of positions for placement of the semiconductor devices. In a first position, for example, the semiconductor device is mechanically aligned; in the remaining positions different characteristics of the device are measured. The characteristics of the semiconductor devices being measured are evaluated in an appropriate instrument. Having been evaluated, the semiconductor devices then enter a last position, from there they are introduced into a sorting system which sorts the devices according to the results evaluated.

The miniaturization of semiconductor devices, however, has made it impossible to use previously known sorting and measuring instruments especially since such devices are mostly unsupported. Thus, a new method and apparatus for arranging or lining up and measuring, as well as sorting semiconductor devices was made necessary.

SUMMARY OF THE INVENTION

It is therefore an object of the present invention to provide a new and more suitable method and apparatus for arranging, measuring and sorting miniature semiconductor devices.

It is a further object of the present invention to provide method and apparatus for arranging, measuring and sorting unsupported miniature semiconductor devices.

It is also an object of the present invention to provide method and apparatus for arranging, measuring and sorting conventional semiconductor devices encapsulated in a housing.

Another object of the present invention is to provide apparatus which is so constructed that the semiconductor device can be measured at frequencies near the gigaHertz limit.

Finally, it is an object of the present invention to provide method and apparatus for arranging, measuring and sorting semiconductor devices which method and apparatus can keep the cost of manufacturing such devices relatively inexpensive.

In brief, according to the present invention, prepared semiconductor devices are brought onto a vertically oblique, planar, funnel-shaped member on which such devices are spread out while they are sliding to the lower and narrower end thereof. At the lower end of the oblique plane, parallel disposed bands or tracks are arranged on which individual semiconductor devices line up, one behind the other. Each semiconductor device has a head portion which comprises a housing or a synthetic mass. Each head portion is supported by the edges of the bands or rails. Extending from each head portion are electrode leads. The bands or tracks themselves are provided in such a manner that one track always separate the electrode leads of two rows of semiconductor devices.

The bands or tracks comprise electrical insulation material, either of a synthetic foil or of ceramic plates. The bands or tracks include contact means which are portions of the insulation material covered with metallic layers at certain predetermined locations which serve as measuring positions. These locations are electrically connected to the measuring instruments. By compressing the flexible bands or rails towards each other in the regions of the measuring positions, the electrode leads disposed thereinbetween are electrically connected to the contact means provided on the bands or tracks.

The present invention will be further explained with the aid of a preferred embodiment.

DESCRIPTION OF THE PREFERRED EMBODIMENT

Figure 1:
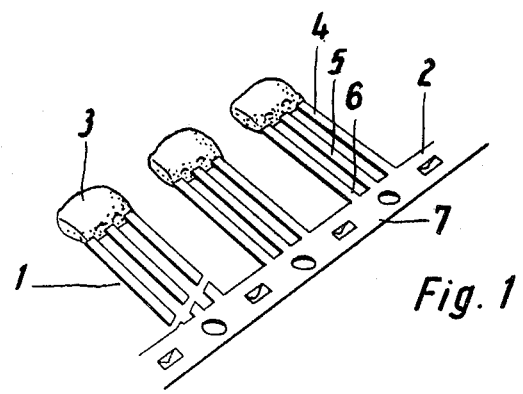
FIG. 1 is a perspective view of subminiature transistors produced according to a strip technique.

The subminiature transistors 1 shown in FIG. 1 are connected to a comblike strip 2. A semiconductor wafer is soldered to one of the teeth on the comblike strip 2 whereas the remaining electrodes of the wafer are electrically connected to adjacent teeth via thin lead wires. Then the strip 2 containing a plurality of connected transistors 1 is immersed in casting resin mass. The semiconductor device and the connecting points are thus embedded in an insulating synthetic mass 3. For each transistor, three electrode leads 4, 5 and 6 protrude from the synthetic mass. These electrode leads which are in the form of flat elongated elements can be used as electrical connecting means for the semiconductor device. The enclosed transistors 1 are detached from their common strip 2, as shown in FIG. 1.

Figure 2:
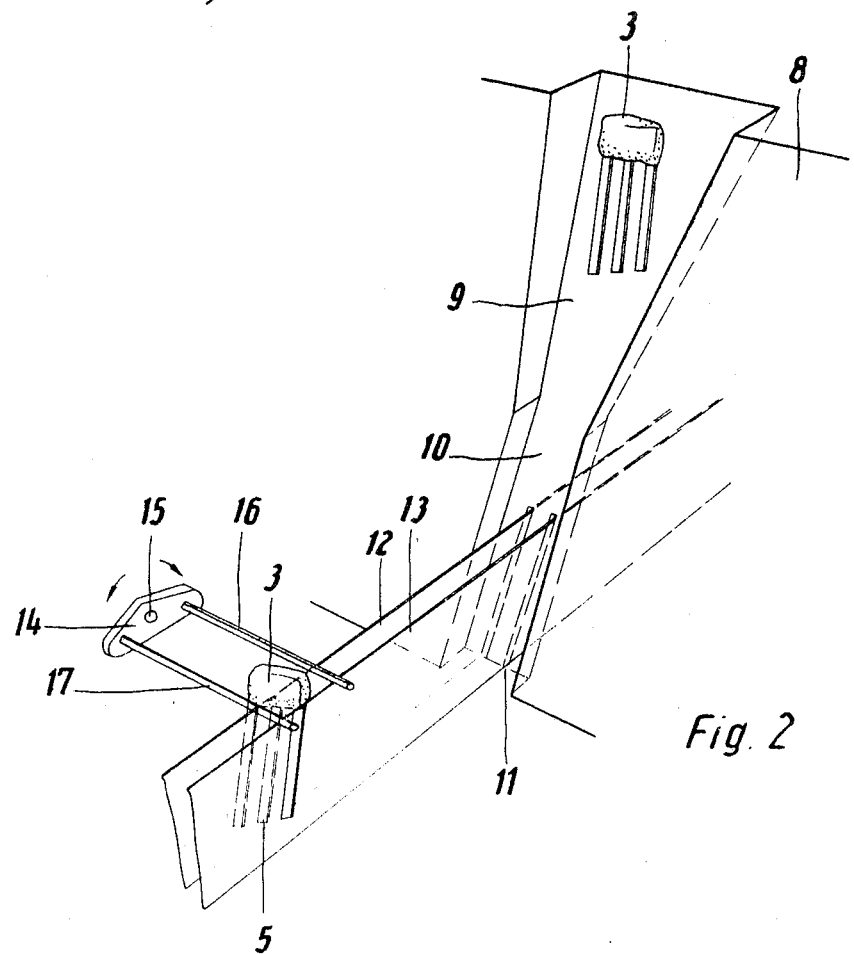
FIG. 2 is a schematic perspective view of the transistors of FIG. 1 being lined up on parallel bands or tracks.

The individual transistors 1 are then introduced onto an oblique plane 8, as shown in FIG. 2, which plane is at least partially funnel-shaped. The lower, narrower portion 10 of this funnel-shaped plane is wide enough so that there is room enough for one transistor device. Slits 11 are sawed, cut or milled into the lower end of the oblique plane 8 and the bands or tracks 12 and 13 are inserted therethrough. To line up the transistors 1, as shown in FIG. 2, at least one band or a plurality of parallel bands (e.g. 12 and 13) is required. When the transistors 1 fall onto the bands 12 and 13 with their electrode leads 4, 5 and 6 pointing downward, they automatically line up on these bands in such a manner that the center electrode lead 5 comes to lie between the two bands 12 and 13. When the transistors fall onto the bands 12 and 13, with their cast-resin heads 3, they tumble over or glide on the bands 12 and 13 until the center electrode lead 5 slides between the two bands. In rare cases the devices fall over the sides of the apparatus and are then again placed onto the oblique plane. The bands 12 and 13 consist of an insulating material, are flexible, and are elastically held at their ends.

Figure 6:
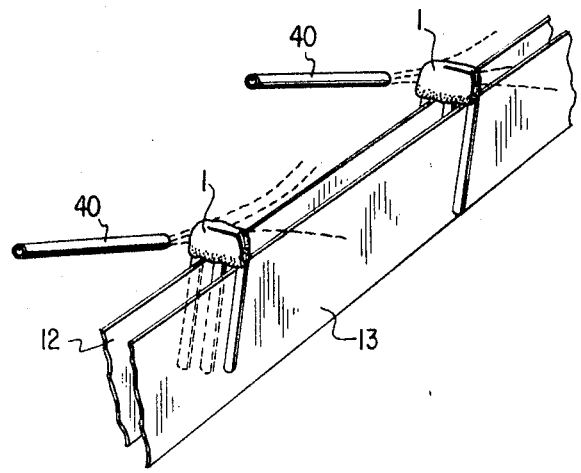
FIG. 6 is a schematic representation of an apparatus for pneumatically transporting the transistors along the parallel tracks.

The transistors 1 can be transported on the bands 12 and 13 to certain predetermined measuring positions by means of controlled pneumatic, vibratory or mechanically operated conveying means (not shown). Thus, for example, air conduits 40 (Figure 6) can be disposed above the bands 12 and 13, and by means of the air pressure therefrom, the semiconductor devices 1 can be transported along the bands 12 and 13 and a new semiconductor device 1 blown into the measuring position after a previous device has been measured. A device 14 takes care that there is only one transistor 1 in the measuring position at any one time. The device 14 is provided with two struts 16 and 17 and is pivotally mounted at point 15. One of the struts, strut 17, serves as an abutting surface for the transistors. If the strut 17 is turned upwardly, by pivoting device 14, the transistor 1 located in the measuring position can be blown away or pushed away. Meanwhile, the other strut 16 prevents further transistors 1 from following. If then the device 14 is pivoted in the opposite direction, only one transistor 1 can follow into the measuring position, since now the strut 17 forms the abutment surface and prevents further transistors 1 from following.

Figure 3:
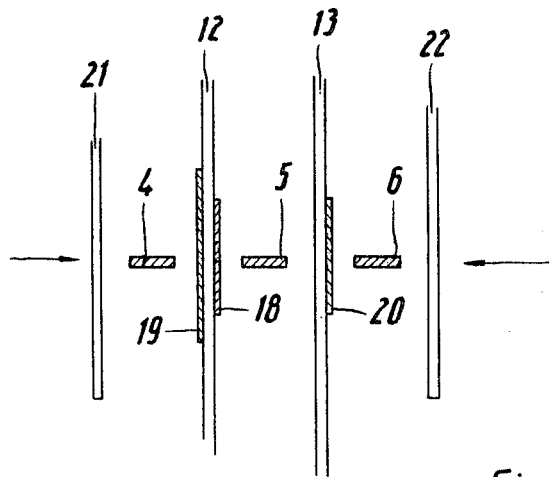
FIG. 3 is a schematic view of a measuring position according to the invention.

FIG. 3 is a schematic view of the layout of a measuring position. The electrode leads of a transistor 1 are indicated cross-sectionally by rectangles 4, 5 and 6. The inner surface of foil or sheet 12 is coated with copper 18 or another good electricity conducting metal and the outer surfaces of both foils 12 and 13 are also provided with copper coatings 19 and 20. Two further foils 21 and 22 are disposed parallel to the foils 12 and 13 in such a manner that the electrode leads of the transistor device 1 to be tested extend through the spaces defined between the foils 21, 12, 13 and 22 respectively. If, as this is shown by arrows in FIG. 2, the foils 21 and 22 are pressed against each other, the electrode leads 4, 5 and 6 come into contact with the metal coatings, described above, which are electrically connected to the electrical measuring instruments (not shown) via conductive paths (not shown) on the foils 12 and 13 or via connecting leads (not shown). The two outer foils 21, and 22 can be compressed towards each other pneumatically. It has been found advantageous to first cover the foils 21 and 22 with copper in the regions defining the predetermined measuring positions in order to provide the connecting or contacting surfaces, respectively. The metallic contacts are then produced with the aid of the known photolacquer and etching technique.

Figure 4:
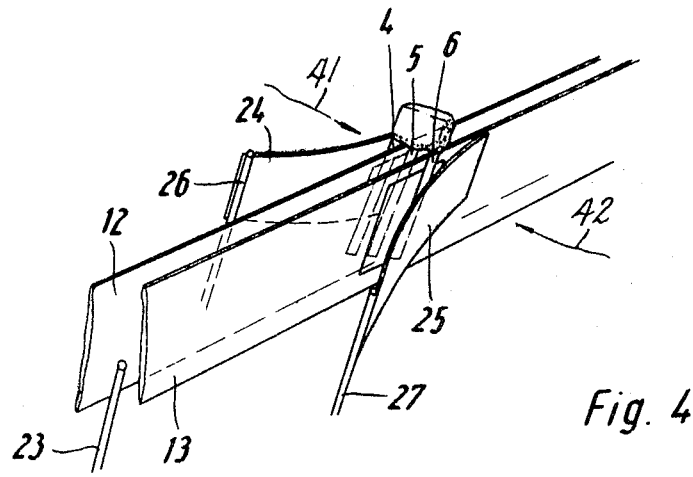
FIG. 4 is a schematic perspective view of a measuring position having electrical connecting arms.

Figure 4 shows a similar measuring position. One or both foils 12 and 13 are again coated with copper on their inner surfaces. This copper coating is connected to measuring instruments via the connecting wire 23. Both bands 12 and 13 are disposed in the measuring position between two contact arms 24 and 25, which, for example, consist of a thin metal foil and are also pneumatically pressed for example by means of sources of pneumatic pressure indicated schematically by the arrows 41, 42, against the outer electrode leads 4 and 6. Thus the center electrode lead 5 is brought into electrical contact with the metal coating on at least on of the foils 12 or 13. The contact arms 24 and 25 are also connected to electrical measuring instruments via connecting wires 26 and 27.

Figure 5:
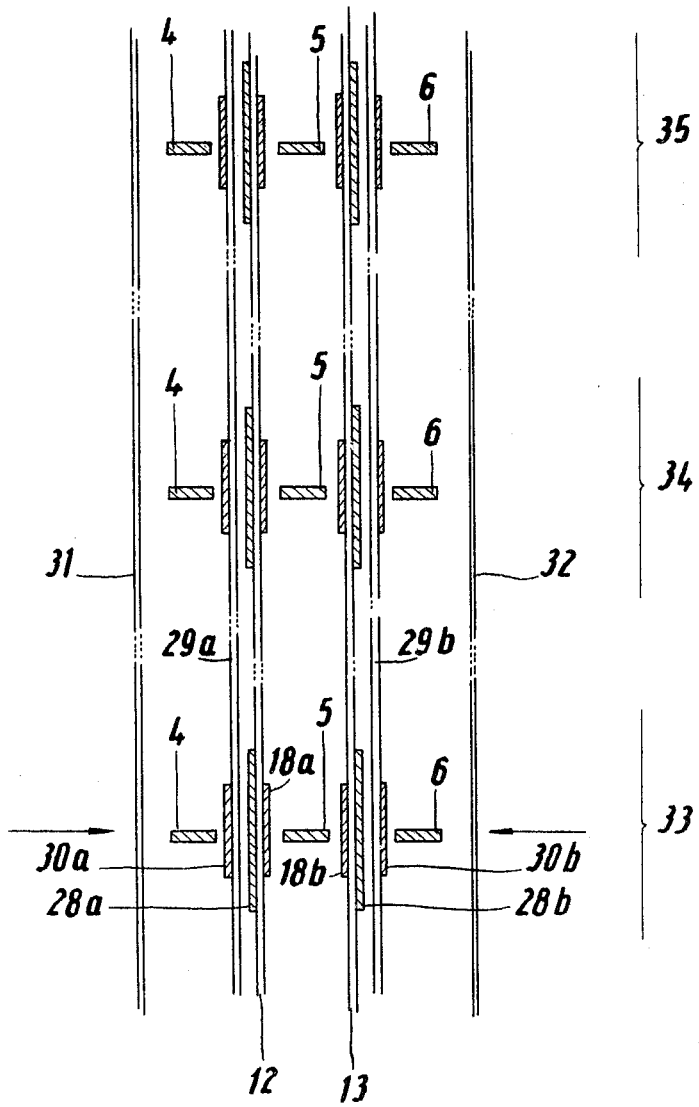
FIG. 5 is a further schematic view of shielded measuring positions according to the invention.

FIG. 5 is a schematic view of a plurality of measuring positions which are constructed particularly for measurements at high frequencies. The two foils 12 and 13 are coated with copper on their inner as well as on their outer surfaces. Whereas the inner copper coatings 18a and 18b serve to contact the center electrode lead 5, the outer copper layers 28a and 28b are at ground potential and serve to shield the contact surfaces on the different foils from each other. To prevent short circuits, it is now necessary to provide a further foil 29a and 29b, respectively, parallel to the two foils 12 and 13 and immediately adjacent thereto. These foils 29a and 29b are provided on their outer surfaces with copper contacts 30a and 30b to provide contacts for the outer electrode leads 4 and 5. Two further foils 31 and 32, between which the transistor 1 is located, serve to press the electrode leads 4, 5 and 6 into the metal contact areas. The outer foils 31 and 32 can also be coated with copper on their respective inner surfaces. It is also possible to provide further intermediate foils which are coated with metal and whose metal coatings are connected to ground potential for purposes of shielding.

Three measuring positions are shown in FIG. 5. The first position, generally indicated 33, serves to orient transistor 1 being measured on the bands or tracks, i.e., it must be determined on which side of the measuring arrangement the emitter of the object being tested is disposed. Two further measuring positions generally indicated as 34 and 35 serve to measure the characteristics of transistor 1. Depending on the orientation of the transistor 1, the transistor 1 is transported to one or the other of these two measuring position.

Figure 7:
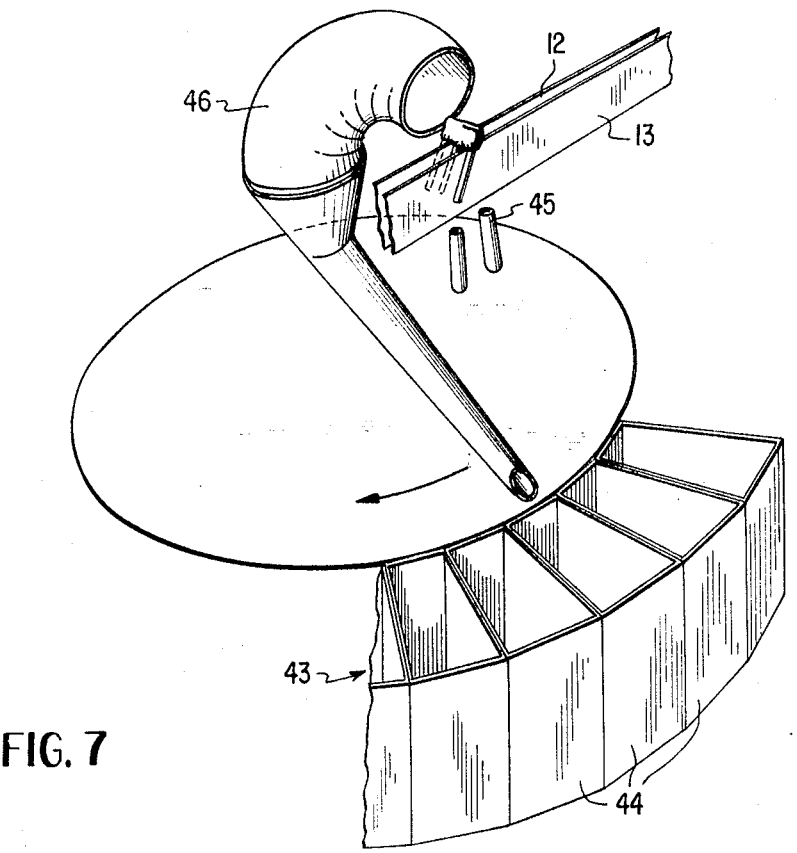
FIG. 7 is a schematic representation of an arrangement for sorting the various semiconductor devices after they have been tested.

At the end of the bands a sorting scheme is advantageously disposed. This sorting scheme can consist, for example as shown in FIG. 7, of a rotatable table arrangement 43 having various sorting compartments 44 provided therein. After the characteristics of a transistor have been measured, a data processing apparatus determines into which group the measured transistor belongs. The sorting scheme i.e., the table 43, is brought into the appropriate position, depending on the evaluated measuring results, and the transistor 1 is then blown or pushed, for example by means of pneumatic nozzles 45, from the rails or bands 12 and 13 and into the associated sorting compartment 44 via a funnel type arrangement 46.

The new sorting method can, of course, also be employed for sorting and measuring semiconductor devices which are provided with more than three electrode leads. It is then only necessary to correspondingly increase the number of bands. For semiconductor devices having a relatively large housing, bands or tracks made of a ceramic material and metallized at certain points can be used instead of the insulating bands.

It will be understood that the above description of the present invention is susceptible to various modifications, changes, and adaptations, and the same are intended to be comprehended within the meaning and range of equivalents of the appended claims.

I claim:

1. Apparatus for arranging and testing semiconductor devices having a plurality of electrode leads extending from a housing thereof, wherein the semiconductor devices are lined up, one behind the other, comprising:
   a plurality of spaced parallel tracks, each of which is formed from a flexible foil of insulating material, for supporting the housing of the semiconductor body so that the electrode leads extend between the tracks with each pair of leads being separated by one of the tracks;
   means for feeding said semiconductor devices onto said tracks;
   electrical contact means, including areas of said foils covered by a layer of material having good electrical conductance, provided on portions of said tracks for electrically contacting and connecting the electrode leads on said semiconductor devices to measuring instruments, said contact means defining measuring positions on said foils at predetermined locations therealong; and
   means at said measuring locations for pressing said tracks together to cause said contact means to contact said electrode leads of said semiconductor devices.

2. The apparatus defined in claim 1 wherein said feeding means comprises a vertically oblique, funnel-shaped planar member having said plurality of parallel tracks provided at the narrower lower end thereof.

3. Apparatus as defined in claim 2 wherein said vertically oblique member can accommodate only one semiconductor device at a time from its lower end onto said parallel tracks.

4. Apparatus as defined in claim 3 wherein slitted guide openings are provided at the lower end of said funnel-shaped, planar member; and said parallel tracks lining up the semiconductor devices extending through said guide openings.

5. Apparatus for arranging and testing semiconductor devices having three electrode leads, wherein the semiconductor devices are lined up, one behind the other, the improvement comprising in combination:
   a vertically oblique, funnel-shaped planar member whereon semiconductor devices are initially disposed, the narrower lower end of said member being able to accommodate one semiconductor device at a time;

a pair of parallel tracks provided at said narrower, lower end of said member whereon said semiconductor devices are fed and lined up with the center electrode lead of said devices being disposed between said tracks, each of said tracks consisting of a flexible foil of insulator material;

electrical contact means being provided on at least portions of said tracks for electrically connecting the electrode leads on said semiconductor devices to measuring instruments, said contact means defining measuring positions on said foils at predetermined locations therealong; said contact means being areas of said foils covered by a layer of material having good electrical conductance.

6. Apparatus, as defined in claim 5, wherein a first testing position is provided to determine the location of the electrode leads that extend between said tracks and further testing positions are provided for each possible electrode location to determine the characteristics of the semiconductor devices.

7. Apparatus as defined in claim 5 wherein said apparatus further comprises intermediate sheets to electrically shield the electrical contact means from one another; said contact means being connected to ground potential at the measuring position.

8. Apparatus for arranging and testing semiconductor devices having three electrode leads, wherein the semiconductor devices are lined up, one behind the other, the improvement comprising in combination a vertically oblique, funnel shaped planar member whereon semiconductor devices are initially disposed, the narrower lower end of said member being able to accommodate one semiconductor device at a time;

a pair of parallel tracks provided at said narrower, lower end of said member whereon said semiconductor devices are fed and lined up with the center electrode lead of said devices being disposed between said tracks, said tracks being formed by foils of insulating material;

electrical contact means being provided on at least portions of said tracks for electrically connecting the electrode leads of said semiconductor devices to testing instruments, said electrical contact means including, each of said foils being provided with metal layers on their respective surfaces away from each other; at least one of said foils being provided with a metal layer on a surface facing said other foil; said metal layers being electrically connected to testing instruments by way of conductive paths provided therefor.

9. Apparatus for arranging and testing semiconductor devices having three electrode leads, wherein the semiconductor devices are lined up, one behind the other, the improvement comprising in combination:

a vertically oblique, funnel shaped planar member whereon semiconductor devices are initially disposed, the narrower lower end of said member being able to accommodate one semiconductor device at a time;

a pair of parallel tracks provided at said narrower, lower end of said member whereon said semiconductor devices are few and lined up with the center electrode lead of said devices being disposed between said tracks, said tracks being formed by foils of insulating material;

electrical contact means being provided on at least portions of said tracks for electrically connecting the electrode leads of said semiconductor devices to testing instruments, said electrical contact means defining measuring positions at predetermined locations along said tracks, said contact means further comprising metallic electrical connecting arms disposed parallel to the insulated tracks at the measuring positions provided thereon; pneumatic actuating means; said connecting arms being pressed towards said tracks and against the electrode leads of the lined up semiconductor devices by said pneumatic actuating means.

10. Apparatus as defined in claim 1 said apparatus further comprising a displaceable sorting device provided at the end of said tracks; said sorting device including separate compartments for different semiconductor devices according to characteristic evaluations made by the measuring instruments.

11. Apparatus as defined in claim 1 further comprising means for separating, in consecutive order, individual semiconductor devices, at each measuring position provided, from the other semiconductor devices lined up on said tracks.